(12) United States Patent
Martens

(10) Patent No.: US 7,024,251 B2
(45) Date of Patent: Apr. 4, 2006

(54) METHOD TO CONTROL A PROCESS

(75) Inventor: Franciscus Johanna Arnoldus Martens, Amsterdam (NL)

(73) Assignee: Shell Oil Company, Houston, TX (US)

(*) Notice: Subject to any disclaimer, the term of this patent is extended or adjusted under 35 U.S.C. 154(b) by 8 days.

(21) Appl. No.: 10/510,181

(22) PCT Filed: Apr. 4, 2003

(86) PCT No.: PCT/EP03/03594
§ 371 (c)(1),
(2), (4) Date: Oct. 4, 2004

(87) PCT Pub. No.: WO03/085467
PCT Pub. Date: Oct. 16, 2003

(65) Prior Publication Data
US 2005/0256592 A1 Nov. 17, 2005

(30) Foreign Application Priority Data
Apr. 5, 2002 (EP) ................. 02076369

(51) Int. Cl.
*G05B 11/01* (2006.01)
*G05B 19/05* (2006.01)

(52) U.S. Cl. .............. 700/21; 700/266; 700/268; 700/20

(58) Field of Classification Search .......... 700/282, 700/21, 20, 266, 268
See application file for complete search history.

(56) References Cited

U.S. PATENT DOCUMENTS 5,210,821 A * 5/1993 Yazaki et al. ............ 700/248
5,450,346 A * 9/1995 Krummen et al. ........ 700/11
6,269,286 B1 * 7/2001 Tse et al. ................. 700/271

OTHER PUBLICATIONS

International Search Report dated Jul. 23, 2003.

* cited by examiner

*Primary Examiner*—Leo Picard
*Assistant Examiner*—Steven R. Garland
(74) *Attorney, Agent, or Firm*—Charles W. Stewart

(57) ABSTRACT

A method to control a process, wherein the status of the process can be altered by a multitude of actions, wherein the action is controlled by basic control units, wherein at least one basic control unit is coordinated by at least one group control unit and wherein this basic control unit has various functions.

9 Claims, 5 Drawing Sheets

Fig.2(cont.a)
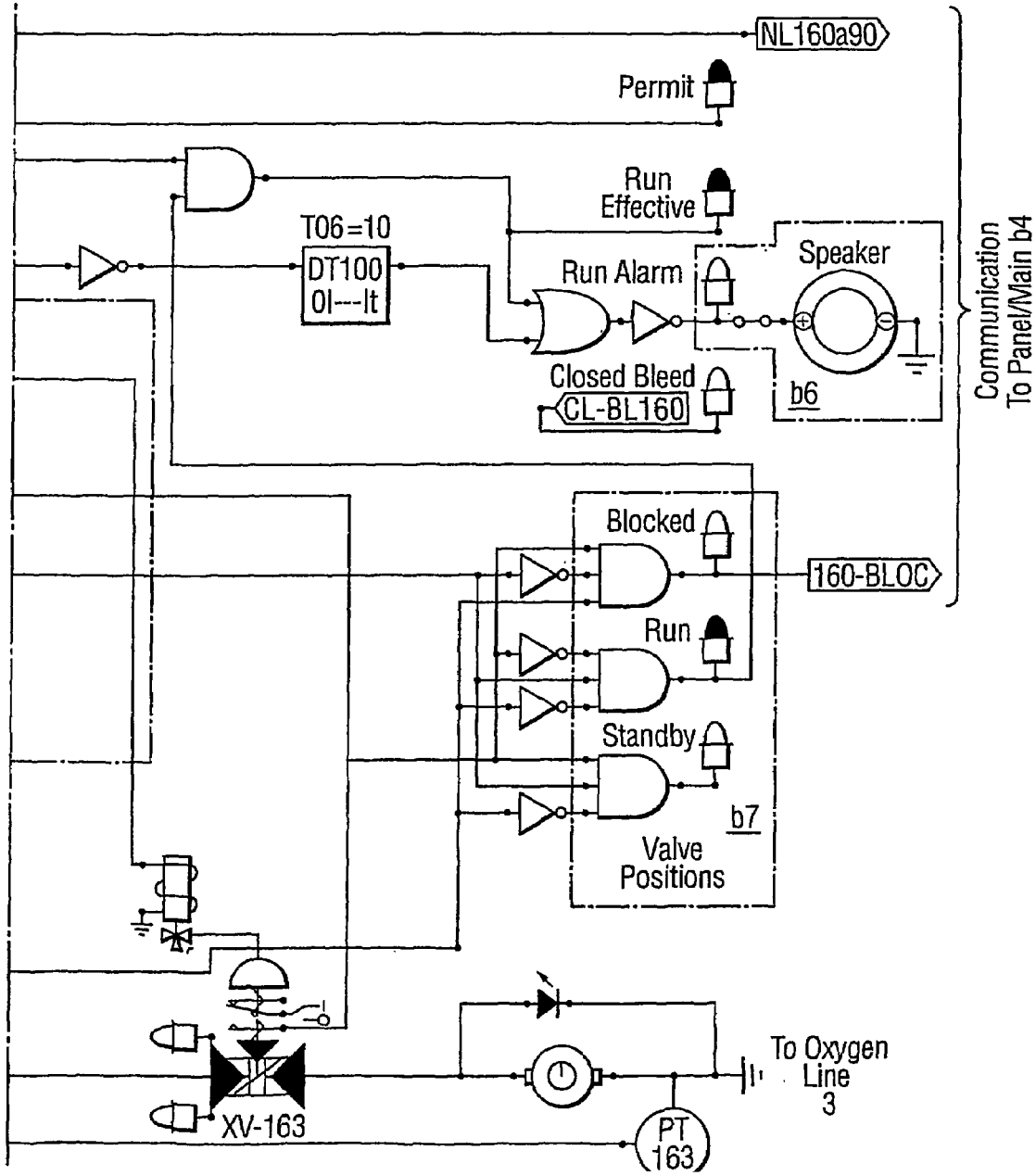

METHOD TO CONTROL A PROCESS

The invention is directed to a method to control a process, wherein the status of the process can be altered by a multitude of actions wherein the action is controlled by basic control units, wherein a basic control unit is coordinated by a group control unit.

Such process control schemes are known and for example described in Ullmann's Encyclopedia of Industrial Chemistry, Vol. B6, pages 416–427.

A problem with such control schemes is that when applied for processes, which inherently have a risk of failure, and which require high safety measures a complicated safeguarding and control scheme is required. Such processes are generally controlled by process control schemes comprising more than one group control unit, each of which may have safeguarding measures according a certain—often extensive—decision tree for corrective actions that may be directed to the same action or conflicting actions depending the circumstances. Complicated control schemes result. Furthermore debugging and maintenance of such a system is found to be very laborious. For example a minor process adjustment or omission of a relevant failure mechanism may require a complete overhaul of the control scheme with its decision tree and corrective actions.

U.S. Pat. No. 5,450,346 disclose a method for the automatic control of batch processes by means of a process control in which the automatic control programs access individual control modules, wherein a) the control instructions and parameter definitions contained in the partial formulations or phases of the formulation program are stored in a separate program level for the activation, interlocking and switch-on blocking of actuators in the field, b) in the separate program level, the control instructions and parameter definitions for each actuator to be activated are collected actuator by actuator and, if appropriate, logically combined, and c) the currently effective activations, interlockings and switch-on blockings are output, actuator by actuator, to the process operating and monitoring system.

A disadvantage of the method disclosed in U.S. Pat. No. 5,450,346 is that when applied on a complex process a complicated control scheme would result, having the disadvantages as also described above.

The object of the present invention is to provide a method to control a process, which does not have the above disadvantage.

This object is achieved with the following method. Method to control a process, wherein the status of the process can be altered by a multitude of actions, wherein the action is controlled by basic control units, wherein at least one basic control unit is coordinated by a group control unit and wherein this basic control unit comprises the following functions:

(b1) means to receive and priority handle a request for a basic control action from one or more group control units or from the operator to be performed by said basic control unit, (b2) means to receive and transform information from the process and/or output from basic control unit(s) and/or output from group control unit(s) into a permit required to start or to continue to execute said action, (b3) means to receive lockouts from basic control unit(s) and/or from group control unit(s) and/or from the operator and/or from the basic control unit itself to prevent the start or to initiate the termination of said action and force the default status or shut-down sequence of the basic control unit until the received lockout(s) has (have) been removed and also a reset has been activated, (b4) means to process an internal lockout and/or export an output or lockout, which output/lockout is related to the status of said action and (b5) means to execute said required action according to a logic or sequence according to which the basic control unit operates, and wherein at least one of these group control unit comprises the following functions:

(g1) means to receive and priority handle a request for a group control action from an even higher hierarchy control unit or from the operator to be performed by said group control unit, (g2) means to receive and transform information from the process and/or from basic control unit(s) and/or from group control unit(s) into a permit required to start or to continue to execute said group action, (g3) means to receive lockouts from basic control unit(s) and/or from group control unit(s) and/or from the operator and/or from the group control unit itself to prevent the start or to initiate the termination of said action and force the default status or shut-down sequence of the group control unit until the received lockout(s) has (have) been removed and also a reset has been activated, (g4) means to process an internal lockout and/or export an output or lockout, which output/lockout is related to the status of said group action and (g5) means to execute said required group action according to a logic or sequence according to which the group control unit operates.

Because both group control units and basic control units have the same basic functionality throughout the whole of the process control scheme becomes transparent for the user.

Because the basic control units have a certain minimum decision tree for corrective actions the group control unit has a much simpler decision tree for corrective actions, can handle much more functions, and has an easier to alter control scheme. Suitably one group control unit coordinates more than one basic control unit. The method to control a process according to the present invention is advantageously used in a process wherein at least one basic control unit is coordinated by at least two different group control units.

The above control scheme is suitably used to control processes with a potentially high risk of hazards. Examples of such processes are gasification processes wherein synthesis gas is prepared by partial oxidation of a solid, liquid or gaseous (hydro)carbon containing feed. In such processes a feed is partially oxidised in the presence of (pure) oxygen—which on itself contributes to a potential risk—to prepare a highly reactive product, namely a mixture of carbon monoxide and hydrogen. Thus it will be clear that in such processes the conditions during feeding of the oxygen and during gasification and the start-up and shut down sequence are carefully controlled in order to avoid for example oxygen fires as well as full oxidation of the feed, release of the product to the environment or over heating of equipment.

BRIEF DESCRIPTION OF THE DRAWINGS

The invention shall be illustrated by making use of FIGS. 1–3.

DETAILED DESCRIPTION

Figure 1:
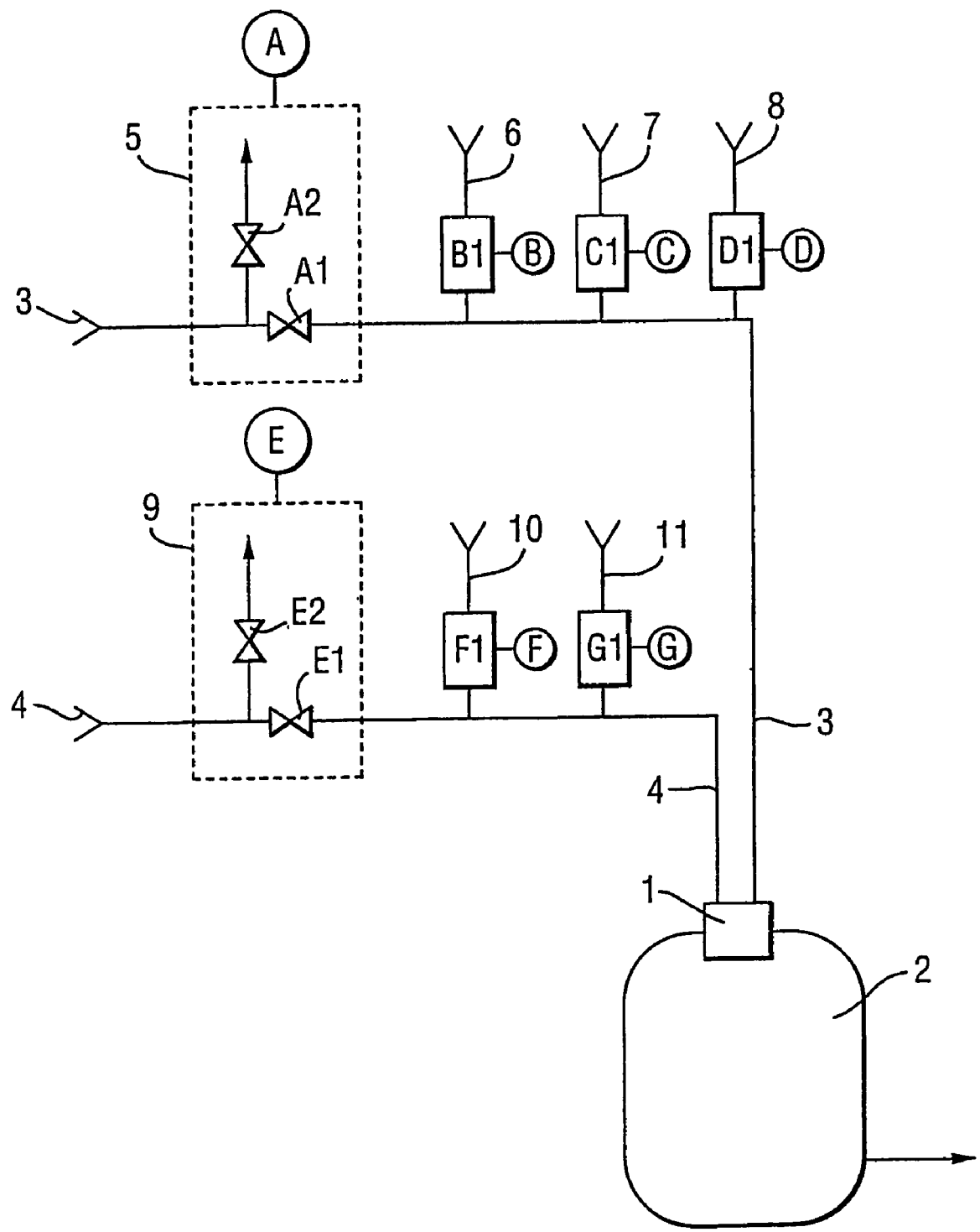
FIG. 1 is a simplified process scheme of a gasification reactor and relevant feed lines and valves.

To burner 1 of reactor 2 in FIG. 1 a feed line 3 for oxygen and a feed line 4 for natural gas is connected. On oxygen feed line 3 means 5 to purge or route oxygen to the atmosphere is present. This purge action is controlled by basic control A operating valves A-1 and A-2. To feed line 3 also means 6 to replace oxygen by high-pressure steam, means 7 to replace oxygen by nitrogen and means 8 to replace oxygen by air are present. The action of supplying or not supplying these gasses are controlled by respectively basic control B, basic control C and basic control D, which in turn operate as an action so-called Double Block and Bleed B-1, C-1, and D-1.

On feed line 4 means 9 to purge or route natural gas to a safe location is present. Basic control E operating valves E-1 and E-2 control this purge action. To feed line 4 also means 10 to add high-pressure steam to the natural gas and means 11 to replace natural gas by nitrogen are present. The action of adding or not adding these gasses are controlled by respectively basic control F and basic control G, which in turn operate as an action Double Block Bleed F-1 and G-1.

Basic controls A–G are in turn controlled by more than one group control units (not shown in FIG. 1).

In addition to the above feeds a gasification process may also suitably comprise similar control units for the following process streams: natural gas and air to the auxiliary burner used for reactor pre-heating prior to the start of the gasification, water feed to the waste heat boiler (synthesis gas cooling against steam production in unit downstream of the reactor 2), water feed for cooling the burner 1, vent to heat up stack, synthesis gas routing to the flare or the scrubber, and steam production in the waste heat boiler.

Figure 2:
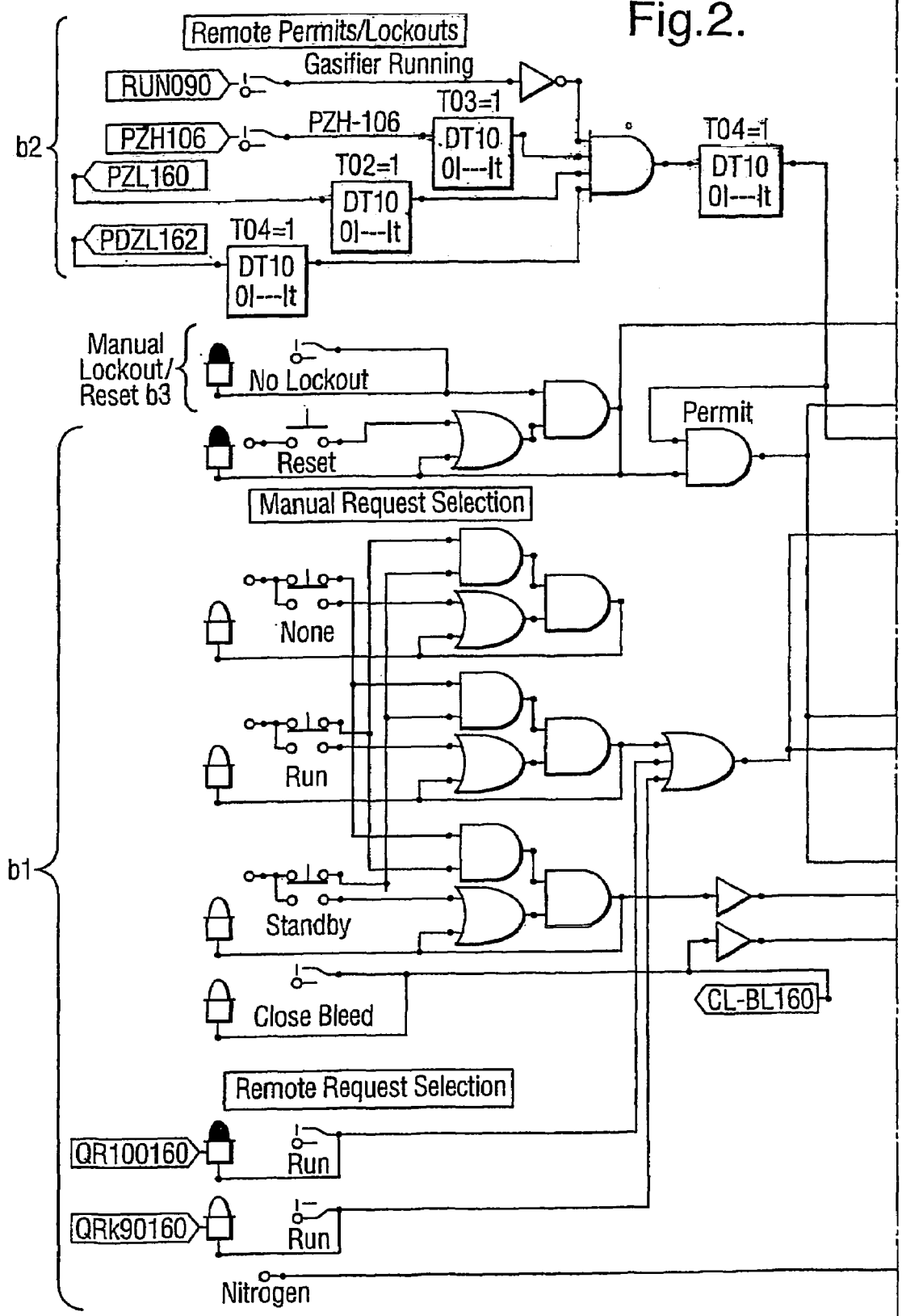
FIG. 2 is a scheme illustrating the logic as part of a basic control unit.
Figure 2:
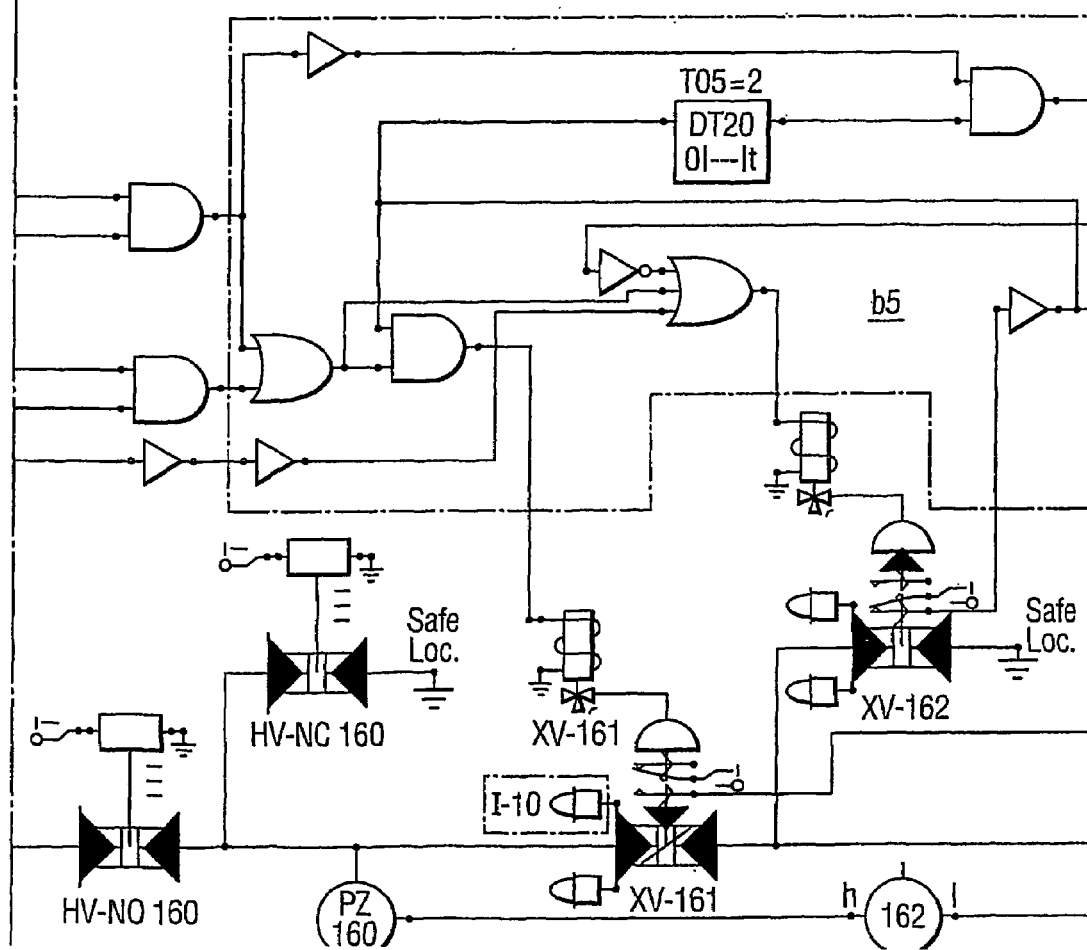

FIG. 2 shows a more detailed description of basic control C of FIG. 1. Basic control C has (b1) means to receive and priority handle a request for a basic control action from one or more group control units or from the operator to be performed by said basic control unit. Possible actions which are suitably controlled by the basic control unit are controlling a Single Block (closed bleed), or sequence controlling Double Block and Bleed (DBB) (none, standby or run), and/or enabling/disabling control valves for Distributed Control System (DCS) functions (not shown). The valve arrangement C-1, which is controlled by basic control C intends to stop/separate the nitrogen from the process at the absence of any manual or remote request, intends to prepare the nitrogen up to the last block (XV-163) at "manual standby" request only, and intends to have flow of the nitrogen to the process at "run" request, either by manual or remote request and regardless of "standby" request. When used in a certain sequence the manual "close bleed" request and the other manual requests are useful in verifying valve leakage rates (which is a safety issue). Obviously for this latter use additional instrumentation (not shown) will be present.

The basic control unit C will also comprise (b2) means to receive and transform information from the process and/or output from basic control unit(s) and/or output from group control unit(s) into a permit required to start or to continue to execute said action. For example basic control unit C will not supply nitrogen to the process when the gasification is ongoing, or when the nitrogen pressure is too high (PZH-106) or to low (PZL-160) or the pressure differential across certain valves and orifice (PDZL-162) is not positive enough. The basic control unit C may also comprise (b3) means to receive lockouts from basic control unit(s) (not shown) and/or from group control unit(s) (not shown) and/or from the operator (shown) and/or from the basic control unit itself (not shown) to prevent the start or to initiate the termination of said action and force the default status or shut-down sequence of the basic control unit until the received lockout(s) has (have) been removed and also a "reset" has been activated. The basic control unit C will also comprise (b4) means to process an internal lockout and/or export an output or lockout, which output/lockout is related to the status of said action. For example the manual lockout (NL160*ago*) is shown as forwarded to a group control unit, and the output (160-BLOC) shown is the confirmation of the status of the block valves closed and bleed valve open as is forwarded to a group control unit.

The basic control unit C will also comprise (b5) means to execute said required action according to a logic or sequence according to which the basic control unit operates. For example the bleed valve (XV-162) is to be confirmed closed before both blocks (XV-161/163) have permission to open. And the downstream block valve (XV-163) has delay to open (Delay Unit T05) to provide for pre-pressurisation (back-flow prevention). And downstream block valve (XV-163) is to be confirmed closed before the bleed is allowed to open.

Optionally a basic control unit will also comprise (b6) means to alarm (Speaker) and (b7) means to indicate the effect of the controlled action. For example the controlled action is to open a valve and supply nitrogen to a feed line. Means (b7) will indicate whether the valves (XV-161/163) are actually open and the bleed valve (XV-162) closed and nitrogen is actually being supplied as requested.

The basic control unit as shown in FIG. 2 has advantageously an alarm handling, i.e. when at alarm status the request to run is terminated the alarm is conveniently terminated as well.

The basic control unit as shown in FIG. 2 will provide the operator easy access to individual modules, and contains autonomous local valve function validation by means of indicators (I-10 as shown for valve XV-161) and alarm.

Figure 3:
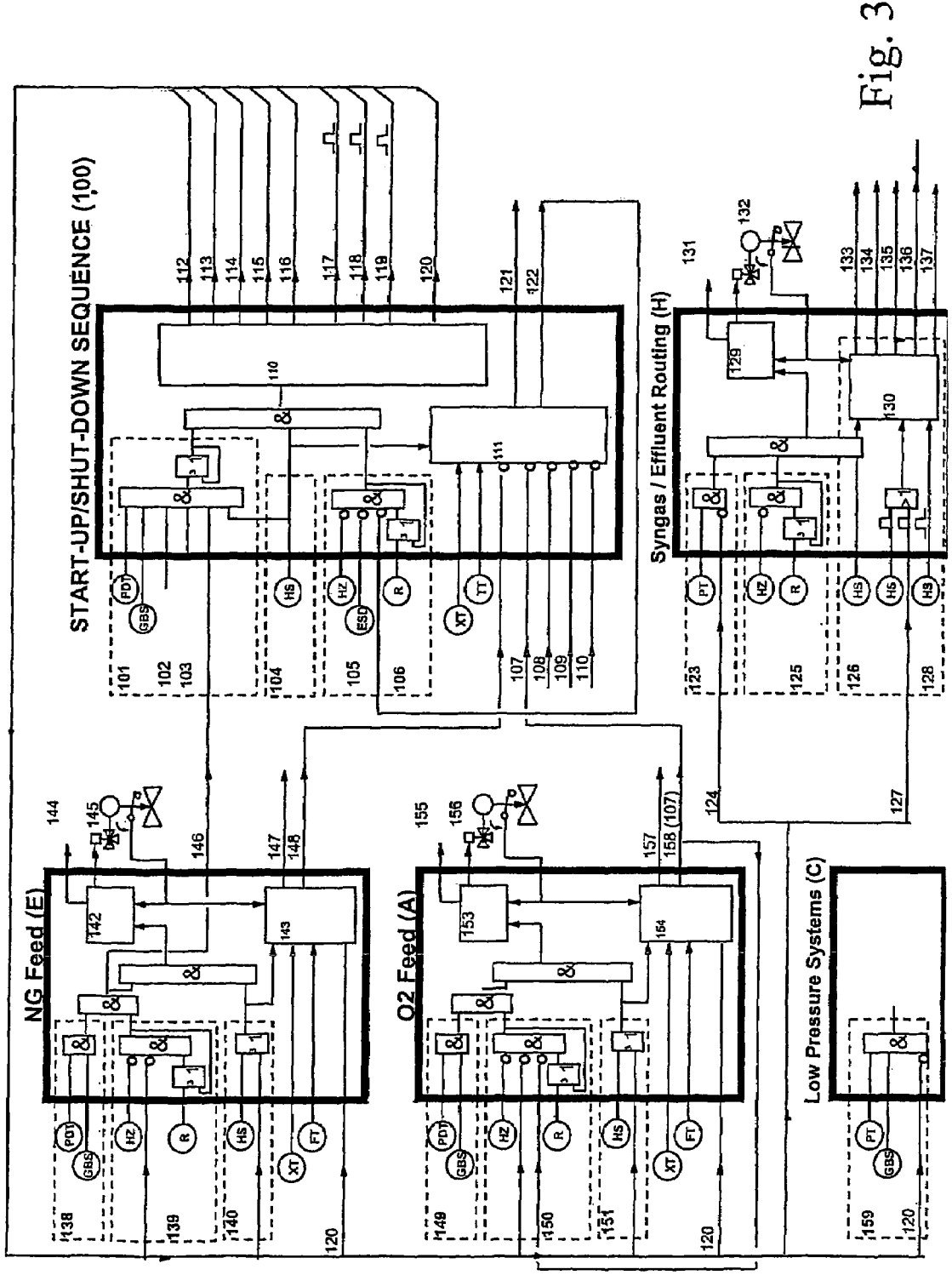
FIG. 3 is an illustration of how one group control unit controls four basic control units in a gasification process of FIG. 1.

FIG. 3 shows how one group control unit (100) and a number of basic control units (A, C, E, H) control the gasifier start and stop sequencing. The group control unit is the Start-up/shutdown sequence control unit (100). The basic control units are the natural gas feed control (E; FIG. 1), the oxygen feed control (A in FIG. 1) and the low pressure purge feed control (C in FIG. 1) and the effluent/syngas routing control unit (H). For clarity reasons some basic control units are not shown in FIG. 3, such as controls B and F of FIG. 1.

The Start-up/shutdown sequence control unit (100) acts as the operator interface for the fully automated sequenced start-up and shut down of the gasification in the reactor (2). This may be performed controlled (via Distributed Control System) and safeguarded (via Emergency Shut Down system). Basically the group control unit (100) controls that a sequence of actions is performed while checking if the correct feed is fed to the burner before proceeding to the next action. If the feedback regarding the correct feed and valve positions (Other permits) is not received by unit (100) within a required time control unit (100) aborts the start-up sequence and starts the shut down sequence.

In FIG. 3 the following acronyms have the following meaning:
PDT=pressure differential transmitter
GBS=proximity limit switch from valve
HZ=manual lock out
R=manual reset
HS=manual request selection XT=instrument signal transmitter
FT=flow instrument signal transmitter
ESD=emergency shut down
TT=temperature instrument signal transmitter
PT=pressure instrument signal transmitter In FIG. 3 it is shown that Group control unit (100) is provided with (g1) means to receive and priority handle a start/stop request (104). Group control unit (100) is further provided with (g2) means to receive and transform information from the process and/or from basic control unit(s) (e.g. Unit E and A in FIG. 3) and/or from group control unit(s) into a permit required to start (101–103) or to continue (107–110) to execute said group actions.

Group control unit (100) further provided with (g3) means to receive lockouts from basic control unit(s) (105) and/or from group control unit(s) and/or from the operator (HZ or ESD) and/or from the group control unit itself (122) to prevent the start or to initiate the termination of said action and force the default status or shut-down sequence of the group control unit until the received lockout(s) has (have) been removed and also a reset (R) has been activated.

Group control unit (100) further provided with (g4) means (111) to process an internal lockout (122) and/or export an output or lockout (121), which output/lockout is related to the status of said group action and (g5) means (110) to execute said required group action according to a logic or sequence according to which the group control unit operates to control the basic control units via (112)–(120).

Basic control unit (E) is provided with (b1) means to receive and priority handle a remote request (112) for a basic control action from the group control unit or from the operator (HS) to be performed by said basic control unit, (b2) means to receive and transform information from the process (PDT, GBS) and/or output from basic control unit(s) and/or output from group control unit(s) into a permit required to start or to continue to execute said action (142), (b3) means to receive lockouts (139) from the group control unit and/or from the operator (HZ) and/or from the basic control unit itself (see for example control unit A and reference number 107) to prevent the start or to initiate the termination of said action and force the default status or shut-down sequence (142) of the basic control unit E until the received lockout(s) (139, HZ) has (have) been removed and also reset (R) has been activated, (b4) means (143 or 154 for unit A) to process an internal lockout and/or export an output or lockout (147), which output/lockout is related to the status of said action and (b5) means to execute said required action according to a logic or sequence (142) according to which the basic control unit operates.

Basic control unit (A), (G) and (H) as shown in FIG. 3 have the same functionalities as basic control unit (E) described above, wherein the reference numbers used refer to the following functions/actions:

Run permit (149), Lockout reset (150), Request selection (151), Valve sequence processor (153), Process evaluation and response delays (154), Enable DCS flow control (155), Double block and bleed valves (156), Run effective O2 (157), Run alarm O2 (107), Run permit (159), Stack permit (123), Lockout reset (125), Request syngas to flare (127), Request syngas to scrubber (128), Valve sequence processor (129), Priority selection (130), Enable DCS pressure control on valve (131), DCS enable/disable valves (132), Run effective to flare (133), Run alarm to flare (134), Run effective to stack (135), Run alarm to stack (136) and run effective to scrubber (137).

The status of a basic control unit (C) (NITROGEN PURGE TO OXYGEN LINE) may suitably be provided to an operator via a screen. By means of indicators (201–210) on a computer screen dedicated to a single basic control unit the operator will be provided with information about the valve positions, requests, lockouts etc. in an easy to understand manner.

Applicants found that when the above safeguarding and control scheme is applied especially to a gasification process safety and reliability of the process is improved. Further, more operator tasks can be handled by the safeguarding and control scheme than practical in the past. It appears that the on-stream time can be improved in a cost effective manner while avoiding trips of a non-safe nature. The scheme also makes the complex system of control and safeguarding more transparent. Furthermore a high degree of automation can be achieved during start-up, shut down and operation.

That which is claimed is:

1. A method to control a process, wherein a status of the process can be altered by a multitude of actions, wherein an action is controlled by basic control units, wherein at least one basic control unit is coordinated by at least one group control unit and wherein this basic control unit comprises the following functions: (b1) means to receive and priority handle a request for a basic control action from one or more group control units or from an operator to be performed by said basic control unit, (b2) means to receive and transform information from the process and/or output from basic control unit(s) and/or output from group control unit(s) into a permit required to start or to continue to execute said action, (b3) means to receive lockouts from basic control unit(s) and/or from group control unit(s) and/or from the operator and/or from the basic control unit itself to prevent the start or to initiate termination of said action and force a default status or shut-down sequence of the basic control unit until the received lockout(s) has (have) been removed and also a reset has been activated, (b4) means to process an internal lockout and/or export an output or lockout, which output/lockout is related to the status of said action and (b5) means to execute said action according to a logic or sequence according to which the basic control unit operates, and wherein at least one of these group control unit comprises the following functions: (g1) means to receive and priority handle a request for a group control action from an even higher hierarchy control unit or from the operator to be performed by said group control unit, (g2) means to receive and transform information from the process and/or from basic control unit(s) and/or from group control unit(s) into a permit required to start or to continue to execute said group action, (g3) means to receive lockouts from basic control unit(s) and/or from group control unit(s) and/or from the operator and/or from the group control unit itself to prevent the start or to initiate the termination of said group action and force a default status or shut-down sequence of the group control unit until the received lockout(s) has (have) been removed and also a reset has been activated, (g4) means to process an internal lockout and/or export an output or lockout, which output/lockout is related to the status of said group action and (g5) means to execute said group action according to a logic or sequence according to which the group control unit operates.

2. The method according to claim 1, wherein at least one basic control unit is coordinated by at least two different group control units.

3. The method according to claim 2, wherein a basic control action is controlling Single Blocks or sequence controlling Double Block with Bleed, enabling/disabling control valves for Distributed Control System functions or sequences controller actions.

4. The method according to claim 3, wherein the basic control unit will also comprise means to alarm (b6).

5. The method according to claim 4, wherein the basic control unit will also comprise an alarm handling procedure such an alarm is terminated when a request to run (b1) is terminated.

6. The method according to claim 5, wherein the basic control unit will also comprise means (b7) to indicate an effect of the controlled action.

7. The method according to 6, wherein the operator will have access to the status of a basic control unit and wherein the status will also provide information directed to autonomous local valve function validation by means of indicators.

8. The method according to claim 7, wherein the controlled process is a gasification process in which synthesis gas is prepared by partial oxidation of a solid, liquid or gaseous (hydro) carbon containing feed.

9. The method according to claim 8, wherein a group control unit coordinates start up and shut down sequence control with basic control units which control a (hydro) carbon feed, an oxygen feed, a purge feed and a (synthesis) gas routing.

* * * * *